United States Patent [19]

Normand

[11] Patent Number: 4,732,074
[45] Date of Patent: Mar. 22, 1988

[54] BOMB RETAINING ADAPTOR

[76] Inventor: Marcel Normand, 6161 Fossambault Boul., Fossambault Sur-Le-Lac, Quebec G0A 3M0, Canada

[21] Appl. No.: 46,120

[22] Filed: May 5, 1987

[30] Foreign Application Priority Data

Jun. 26, 1986 [CA] Canada ................................ 512816

[51] Int. Cl.$^4$ .............................................. F41F 5/02
[52] U.S. Cl. ........................................ 89/1.51; 89/1.53
[58] Field of Search ...................... 89/1.51, 1.53, 1.54, 89/1.55, 1.58, 1.59, 1.1; 244/137.4

[56] References Cited

U.S. PATENT DOCUMENTS

| | | | |
|---|---|---|---|
| 3,967,528 | 7/1976 | Baker | 89/1.53 |
| 4,196,879 | 4/1980 | Craigie | 89/1.53 X |
| 4,233,883 | 11/1980 | Miko | 89/1.53 |
| 4,395,003 | 7/1983 | Coutin | 89/1.53 X |
| 4,606,517 | 8/1986 | Adams | 89/1.59 X |

FOREIGN PATENT DOCUMENTS 486400  6/1938  United Kingdom ................ 89/1.51

Primary Examiner—David H. Brown

[57] ABSTRACT

An adaptor for use with a bomb dispenser of the type having a pair of pivoting bomb-retaining arms adapts the dispenser to accommodate a smaller bomb, such as a small practice bomb. The adaptor, when mounted has a bracket secured to each arm of the dispenser. An elongate support bar is carried by the bracket and engages the underside of a bomb. A stabilizing lever mounted on the bracket pivots towards the support bar to engage the bomb and press it against the bar. The position of the lever is adjustable relative to the support. The use of the adaptor eliminates the need for other stabilizing structures such as sway braces, that can interfere with the smaller bombs.

2 Claims, 3 Drawing Figures

BOMB RETAINING ADAPTOR

FIELD OF THE INVENTION

The present invention relates to an adaptor for use with a bomb dispenser of the type having a pair of pivoting bomb-retaining arms.

BACKGROUND

Canadian Patent No. 1,067,754 issued 11 Dec. 1979, to Her Majesty the Queen in right of Canada as represented by the Minister of National Defence and corresponding U.S. Pat. No. 4,112,843, issued 12 Sept. 1978, describe a modular practice bomb that is intended to replace a number of prior art practice bombs of larger size. The new bomb has a diameter half that of the two primary practice bombs that it is intended to replace.

The original practice bombs were launched from a bomb dispenser that was designed to accommodate the larger diameter practice bombs. In order to avoid the significant expense involved in replacing the bomb dispensers, it would be desirable to adapt the known dispensers for use with the smaller diameter bombs. This creates significant problems however, as the smaller diameter bombs, at least in some embodiments, have drag collars that interfere with some of the components, particularly the sway brace assembly of the existing ejector gun. The sway brace serves to engage a bomb gripped by the retaining arms to hold the bomb steady.

SUMMARY

The present invention aims at the provision of an adaptor that can simply and readily be mounted on the existing bomb dispenser, adapting the dispenser for use with the smaller diameter bombs, while making the sway braces unnecessary.

According to the present invention there is provided an adaptor for use with a bomb dispenser having a pair of pivoting bomb-retaining arms, the adapter comprising:

a bracket adapted to be secured to one of the arms of the dispenser;

an elongate support bar carried by the bracket for engagement along the underside of a bomb engaged in the dispenser;

a stabilizing lever mounted on the bracket for pivoting movement toward and away from the support bar, for engagement with the upper side of a bomb engaged in the dispenser; and adjustment means for adjusting the position of the lever relative to the support.

Thus, with a pair of adaptors in place, one on each arm, the two support bars engage the underside of the bomb and extend along a significant portion of its length. The stabilizing levers, by engaging the top side of the bomb ensure a firm engagement of the bomb with the support bars.

BRIEF DESCRIPTION OF THE INVENTION

In the accompanying drawings, which illustrate an exemplary embodiment of the present invention:

DETAILED DESCRIPTION

Figure 1:
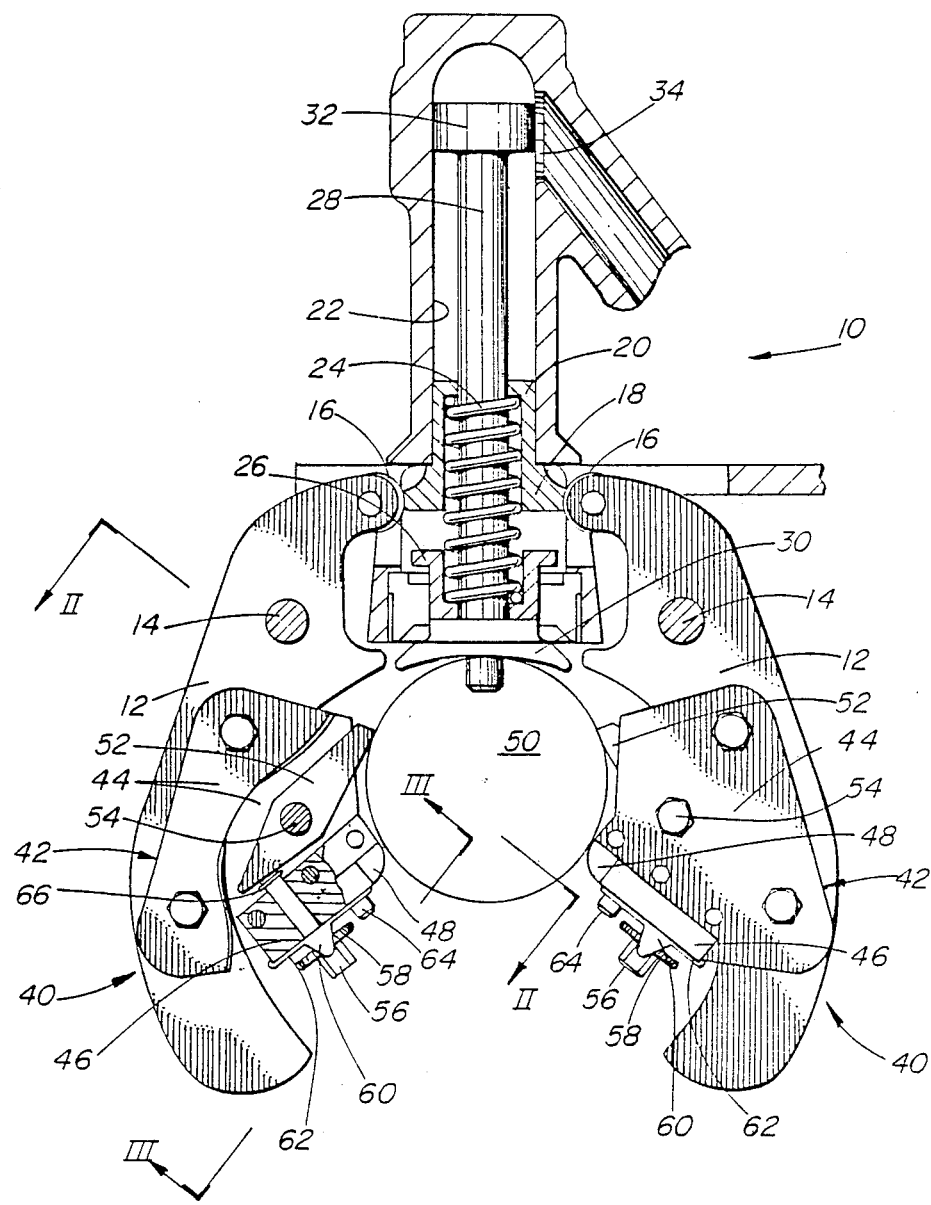
FIG. 1 is an end elevation of a bomb dispenser equipped with two adaptors according to the present invention.
Figure 2:
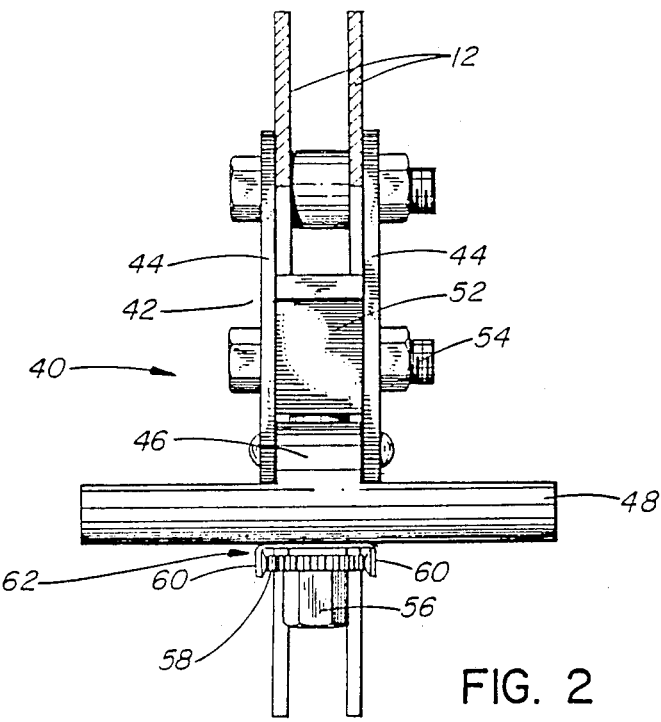
FIG. 2 is a view along line II of FIG. 1.
Figure 3:
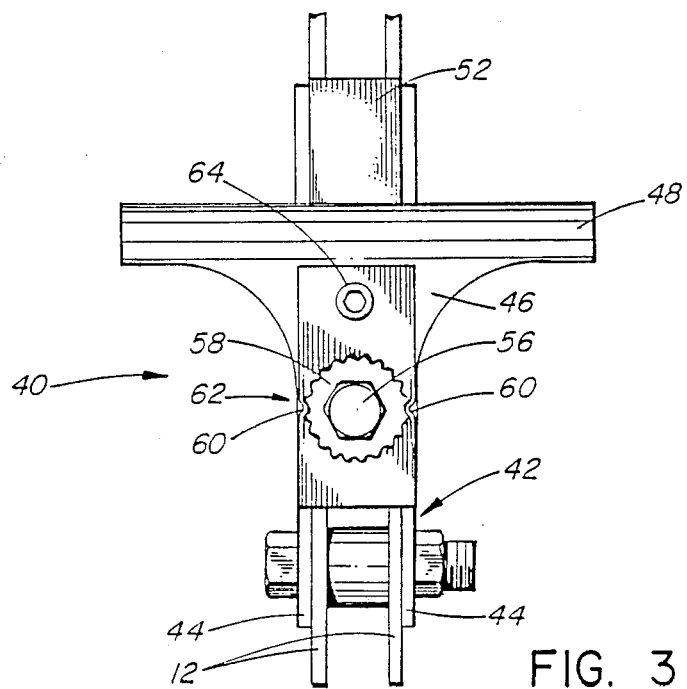
FIG. 3 is a view along line III—III of FIG. 1.

Referring to the drawings, and particularly to FIG. 1, there is illustrated a bomb dispenser 10 having a pair of bomb retaining arms 12 that pivot about respective axes 14. The arms 12 carry rollers 16 that engage a sear 18 on opposite sides. The sear is equipped with a piston portion 20 that is normally fitted into the end of a cylinder 22. The sear is held in place in the cylinder 22 by a coil spring 24 seated at one end in the sear and at the other in a bearing 26. A piston rod 28 extends through the sear 18, the coil spring 24 and the bearing 26 and is connected to a bomb engaging pad 30 on the underside of the bearing 26. The top end of the piston rod 28 carries an integral piston 32 that rides in the cylinder 22. As illustrated in FIG. 1, the piston is normally positioned across the inlet port 34 of the cylinder 22.

In operation, when gas under pressure is admitted to the port 34, it acts on the sear 18 to drive it from its illustrated position into engagement with the bearing 26. This movement of the sear frees the arms 12 to release a retained bomb. At the same time, engagement of the sear 18 with a bearing 26 displaces the bomb engaging pad 30 and the piston rod 28 to draw the piston 32 down past the port 34. The pressurized gas at port 34 then acts on the top of the piston 32, driving it along the cylinder 22 so as to eject a bomb forcibly from the retainer.

The present invention is concerned with an adaptor adapting this dispenser to accommodate a small diameter practice bomb.

In FIG. 1, two adaptors 40 are shown mounted on the respective arms 12. Each adaptor has a bracket 42 consisting of two parallel plates 44 secured to opposite sides of the respective arm 12. A support 46 of T-shaped configuration is mounted between the two plates 44 so that its elongate support bar 48 extends along the underside of a bomb 50 retained in the dispenser.

Also located between the two plates 44 of each adaptor 40 is stabilizing lever 52 that is mounted for pivoting movement about a bolt 54 in a direction toward or away from the support bar 48. The lever 52 may be pivoted into engagement with the upper side of the bomb 50 engaged in the dispenser.

To hold the lever 52 in place, an adjusting screw 56 extends through a threaded bore in the support 46 to engage the end of the lever 52 opposite the end of that engaging bomb 50. The adjustment screw has a knurled head 58 that engages between two spring loaded vertical members 60 of a clip 62 to prevent the screw from loosening due to vibration. The clip 62 is fastened to the support by a screw 64. A retaining ring 66 is fitted to the lever end of screw 56 to act as a back-up stop for the adjustment screw.

With the illustrated adaptor in place and the bomb retaining arms unlocked and spread open ready to receive a bomb, the procedure for loading the bomb is as followa:

(a) each adjustment screw is turned back three to four turns from its bottomed position;

(b) the bomb is indexed with the dispenser by means of a bomb indexing hole (not illustrated) in the bomb and the indexing pin on the piston rod;

(c) the bomb is pressed up against the ejector, compressing a spring 24 that acts on the sear 18 to press it upwards until the bomb retaining arms 12 snap shut against the bomb body;

(d) the adaptor adjustment screws 56 are then screwed in, causing the lever 52 of each adaptor to press the bomb firmly against the opposing support bar 48. This takes up all the slack in the arm/adaptor/bomb assembly and secures the bomb in place.

Incorporating the bomb's steadying feature in the adaptors not only allows the use of the modular practice bomb in any of its forms in the existing bomb dispensing unit, but also makes bomb loading easier through elimination of the front and rear sway brace assemblies.

I claim:

1. An adaptor for use with a bomb dispenser having a pair of pivoting bomb-retaining arms, the adapter comprising:

a bracket adapted to be secured to one of the arms of the dispenser;

an elongate support bar carried by the bracket for engagement along the underside of a bomb engaged in the dispenser;

a stabilizing lever mounted on the bracket for pivoting movement toward and away from the support bar, for engagement with the upper side of a bomb engaged in the dispenser; and adjustment means for adjusting the position of the lever relative to the support.

2. An adaptor according to claim 1, wherein the adjustment means comprises an adjustment screw.

* * * * *